United States Patent
Nagatsuka et al.

(10) Patent No.: US 11,461,900 B2
(45) Date of Patent: Oct. 4, 2022

(54) DYNAMIC IMAGE ANALYSIS SYSTEM AND DYNAMIC IMAGE PROCESSING APPARATUS

(71) Applicant: Konica Minolta, Inc., Tokyo (JP)

(72) Inventors: Sumiya Nagatsuka, Hino (JP); Naoki Hayashi, Higashimurayama (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/798,906

(22) Filed: Feb. 24, 2020

(65) Prior Publication Data
US 2020/0286235 A1 Sep. 10, 2020

(30) Foreign Application Priority Data
Mar. 8, 2019 (JP) .............................. JP2019-043034

(51) Int. Cl.
*G06T 7/00* (2017.01)
*G06T 5/00* (2006.01)

(52) U.S. Cl.
CPC ............ *G06T 7/0016* (2013.01); *G06T 5/002* (2013.01); *G06T 5/007* (2013.01); *G06T 2207/10116* (2013.01)

(58) Field of Classification Search
CPC ..... G06T 7/0016; G06T 7/0012; G06T 7/254; G06T 5/007; G06T 5/002;
(Continued)

(56) References Cited

U.S. PATENT DOCUMENTS

| 2004/0116808 A1* | 6/2004 | Fritz ......................... G06T 7/60 |
| | | 600/437 |
| 2017/0216627 A1* | 8/2017 | Brooks ................ A61N 5/1048 |

(Continued)

FOREIGN PATENT DOCUMENTS

| JP | S62-44224 A | 2/1987 |
| JP | 2000079110 A | 3/2000 |

(Continued)

OTHER PUBLICATIONS

Merriam Webster Dictionary Definition Coincide, accessed Mar. 29, 2022 (Year: 2022).*

(Continued)

*Primary Examiner* — Matthew C Bella
*Assistant Examiner* — Kathleen M Broughton
(74) *Attorney, Agent, or Firm* — Lucas & Mercanti, LLP

(57) ABSTRACT

A dynamic image analysis system includes a modality and a hardware processor. The modality generates first and second dynamic images each composed of frame images indicating dynamics of a subject. The processor detects a first signal value of a pixel in a first region in each of the frame images of the first dynamic image. The hardware processor detects a second signal value of a pixel in a second region in which an identical site to that of the first region is imaged, the second region being in each of the frame images of the second dynamic image. The processor determines an image processing condition for making the first signal value close to the second signal value based on the first and second signal values detected. The hardware processor performs image processing on the first dynamic image under the determined image processing condition to generate a processed dynamic image.

13 Claims, 7 Drawing Sheets

(58) Field of Classification Search
CPC . G06T 2207/10116; G06T 2207/10016; G06T 2207/20104; G06T 2207/30061
See application file for complete search history.

(56) References Cited

U.S. PATENT DOCUMENTS

| | | | | |
|---|---|---|---|---|
| 2017/0330320 A1* | 11/2017 | Lynch | .................... | G16B 40/20 |
| 2017/0358078 A1* | 12/2017 | Hoff | ......................... | G06T 7/60 |
| 2018/0068446 A1* | 3/2018 | Ross | ..................... | G06T 7/0016 |
| 2018/0247412 A1* | 8/2018 | Gooding | .............. | G06T 11/008 |
| 2018/0349724 A1* | 12/2018 | Xiang | ................. | G06K 9/6288 |

FOREIGN PATENT DOCUMENTS

| | | | | |
|---|---|---|---|---|
| JP | 2011005050 A | | 1/2011 | |
| JP | 2014-079655 A | | 5/2014 | |
| JP | 2015136566 A | * | 7/2015 | |
| JP | 2018-148964 A | | 9/2018 | |
| JP | 2019180883 A | * | 10/2019 | ............. A61B 6/463 |
| NO | 2014/054379 A1 | | 4/2014 | |
| WO | WO-2005032647 A2 | * | 4/2005 | ........... A61B 5/0077 |
| WO | 2018/025347 A1 | | 2/2018 | |

OTHER PUBLICATIONS

Collins Dictionary Definition Coincide, accessed Mar. 29, 2022 (Year: 2022).*
JPO, Office Action for corresponding Japanese application No. 2019-043034, dated May 31, 2022, with English translation.
JPO, Office Action for corresponding Japanese application No. 2019-043034, dated Aug. 16, 2022, with English translation.

* cited by examiner

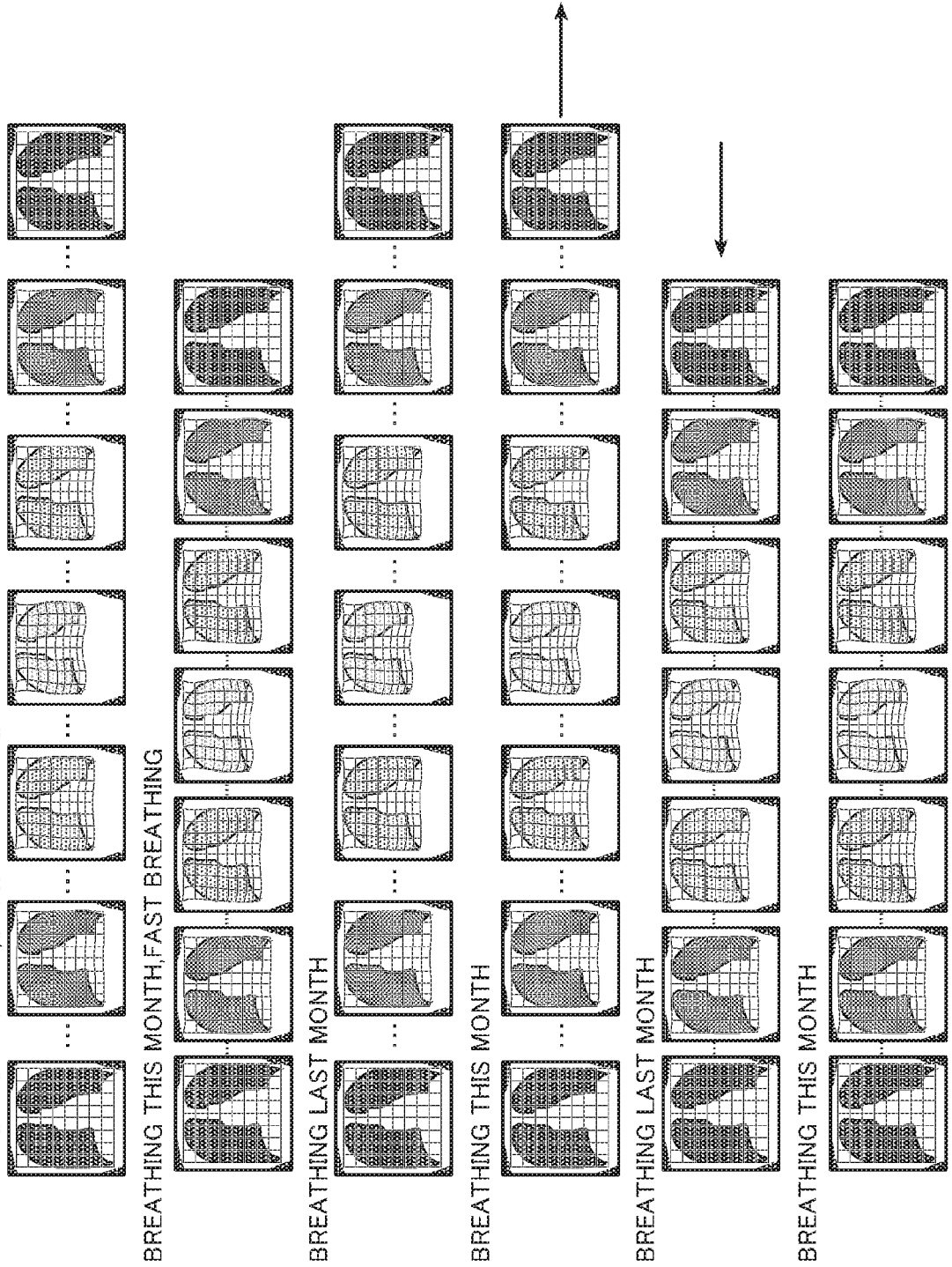

DYNAMIC IMAGE ANALYSIS SYSTEM AND DYNAMIC IMAGE PROCESSING APPARATUS

CROSS-REFERENCE TO RELATED APPLICATIONS

The entire disclosure of Japanese Patent Application No. 2019-043034, filed on Mar. 8, 2019 is incorporated herein by reference in its entirety.

BACKGROUND

Technological Field

The present invention relates to a dynamic image analysis system and a dynamic image processing apparatus.

Description of the Related Art

Technologies for using a dynamic image composed of a plurality of frame images for diagnosis have been recently developed.

Since a radiographed dynamic image has a plurality of frame images (the image changes over time), and therefore, is different from a still image, it is needed to appropriately grasp variable elements among frames therein to make the same into an image on which diagnosis is easier than before.

For example, JP 2011-005050 A discloses an image processing apparatus which performs gradation transform on individual frame images constituting a dynamic image such that a variation in contract in a predetermined reference region can be reduced.

Meanwhile, image diagnosis includes a case where transition from past radiographed images is examined as in medical follow-up as well as a case where the condition of a disease at radiographing is examined.

Since a change in condition of the disease is determined as a change in image when the image is compared with the past images, these images are preferably radiographed and displayed under the same conditions.

Therefore, there are conventionally proposed technologies of performing gradation processing on individual still images which processing is suitable for examining a change in condition of a disease, for example, as in JP 2000-079110 A.

SUMMARY

However, the technology disclosed in JP 2011-005050 A targets frame images in one dynamic image. The suitable conditions for the one dynamic image are not always the conditions that are suitable for dynamic images to be compared, in a case where dynamic images including the one dynamic image which is a target of diagnosis and past dynamic images are displayed, such as a case of medical follow-up.

Moreover, the technology disclosed in JP 2000-079110 A targets still images. Comparison with past images during medical follow-up is an operation performed also for dynamic images as well as for still images. Since it is needed to take differences in states between frames into consideration in the cases of dynamic images each having a plurality of frames, it is difficult to simply apply the technology disclosed in JP 2000-079110 A to medical follow-up with dynamic images.

An object of the present invention is to enable medical follow-up using a radiograph of a target of diagnosis and a past radiograph of the target of comparison to be correctly performed even in the case where the radiographs are dynamic images.

To achieve at least one of the abovementioned objects, according to an aspect of the present invention, a dynamic image analysis system reflecting one aspect of the present invention comprises: a modality that generates dynamic images including a first dynamic image and a second dynamic image each composed of a plurality of frame images indicating dynamics of a subject; and a first hardware processor that: detects a first signal value of a pixel in a first predetermined region in each of the frame images of the first dynamic image generated by the modality; detects a second signal value of a pixel in a second predetermined region in which an identical site to that of the first predetermined region is imaged, the second predetermined region being in each of the frame images of the second dynamic image generated by the modality; determines an image processing condition for making the first signal value in the first predetermined region in the first dynamic image close to the second signal value in the second predetermined region in the second dynamic image, based on the first signal value and the second signal value detected; and performs image processing on the first dynamic image under the determined image processing condition to generate a processed dynamic image.

To achieve at least one of the abovementioned objects, according to another aspect of the present invention, a dynamic image processing apparatus reflecting one aspect of the present invention comprises a hardware processor that: acquires dynamic images including a first dynamic image and a second dynamic image each composed of a plurality of frame images indicating dynamics of a subject, from another apparatus; detects a first signal value of a pixel in a first predetermined region in each of the frame image of the acquired first dynamic image; detects a second signal value of a pixel in a second predetermined region in which an identical site to that of the first predetermined region is imaged, the second predetermined region being in each of the frame images of the acquired second dynamic image; determines an image processing condition for making the first signal value in the first predetermined region in the first dynamic image close to the second signal value in the second predetermined region in the second dynamic image, based on the first signal value and the second signal value detected; and performs image processing on the first dynamic image under the determined image processing condition to generate a processed dynamic image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIGS. 8A, 8B, and 8C are diagrams exemplarily showing another way of matching the phases of the first dynamic image and the second dynamic image;

DETAILED DESCRIPTION OF EMBODIMENTS

Hereinafter, one or more embodiments of the present invention will be described with reference to the drawings. However, the scope of the invention should not be limited to the disclosed embodiments.

Dynamic Image Analysis System

Figure 1:
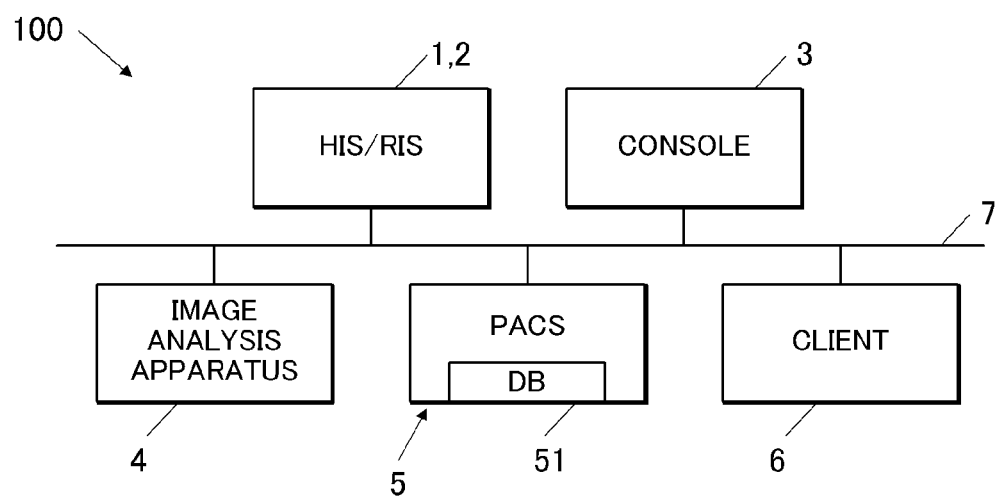
FIG. 1 is a block diagram showing a dynamic image analysis system according to an embodiment of the present invention.

First, a schematic configuration of a dynamic image analysis system according to an embodiment is described. FIG. 1 is a block diagram showing a dynamic image analysis system 100.

As shown in FIG. 1, the dynamic image analysis system 100 of the present embodiment includes a hospital information system (HIS) 1, a radiology information system (RIS) 2, a console 3, an image analysis apparatus 4 (dynamic image processing apparatus), a picture archiving and communication system (PACS) 5 and a client 6.

These can communicate with one another via a communication network 7.

Moreover, the dynamic image analysis system 100 is connected to a not-shown modality via the communication network 7.

The modality only has to be able to generate a dynamic image composed of a plurality of frame images indicating dynamics of a subject, and there can be used, for example, a radial ray irradiation apparatus which repeatedly generates radial rays in pulses, a panel-like radiographic imaging apparatus which repeatedly generates, every time upon reception of the radial rays in pulses, a frame image according to the radial rays thus received, and the like.

Notably, the modality may be connected to the communication network 7 via an apparatus such as the console 3, the image analysis apparatus 4 and the PACS 5, not directly thereto.

Moreover, images may be transferred from the modality to the dynamic image analysis system 100 using a storage medium or a cable, not via a communication network.

The HIS 1 and/or the RIS 2 stores inspection information such as the type of radiographing (the type of the modality used, a distinction between a standing position and a recumbent position, and the like), the site of radiographing, a department name from which the inspection is requested, the age of a person inspected, the gender of the person inspected, and the name of an operator.

Further, the HIS 1 and/or the RIS 2 transmits, based on a request from an apparatus such as the console 3, the image analysis apparatus 4, the PACS 5 and the client 6, the inspection information according to the request to the apparatus.

The console 3 according to the present embodiment is constituted of a PC or a dedicated device.

Moreover, there can be set to the modality or the like through the console 3, on the basis of the inspection information acquired from an apparatus such as the HIS 1 and the RIS 2 or operation by an operator, various radiographing conditions such as radial ray irradiation conditions (a lamp voltage, a lamp current and an irradiation time (mAs value)), and a frame rate.

The image analysis apparatus 4 constitutes a dynamic image processing apparatus and is constituted of a PC or a dedicated device.

Moreover, the image analysis apparatus 4 can analyze still images and dynamic images acquired from the modality to generate analysis result data based on the analysis results.

Details of the image analysis apparatus 4 and the analysis result data above are mentioned later.

The PACS 5 in the present embodiment is constituted of a PC or a dedicated device.

Moreover, the PACS 5 includes a database 51 and can store, in the database 51, the still images and the dynamic images acquired from the modality, the analysis result data generated by the image analysis apparatus 4, and the like.

Details of the analysis result data above are mentioned later.

Moreover, the PACS 5 transmits, based on a request from an apparatus such as the console 3, the image analysis apparatus 4 and the client 6, images and data according to the request out of various images and various data stored in the database 51 to the apparatus.

Notably, the database 51 may be provided as an independent apparatus to the PACS 5.

The client 6 in the present embodiment is configured to be able to be held by the operator in a form of a tablet terminal or the like.

Details of the client 6 are mentioned later.

Image Analysis Apparatus

Figure 2:
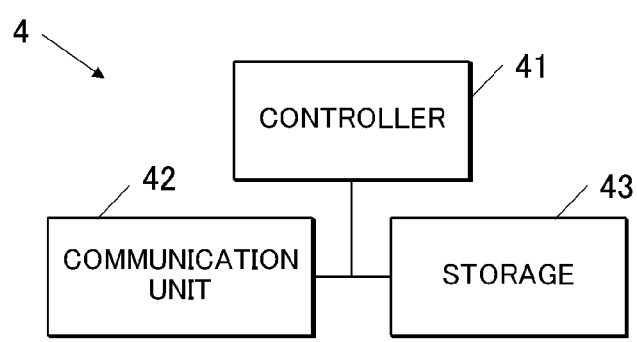
FIG. 2 is a block diagram exemplarily showing a dynamic image processing apparatus included in the dynamic image analysis system of FIG. 1.

Next, a specific configuration of the image analysis apparatus 4 included in the aforementioned dynamic image analysis system 100 is described. FIG. 2 is a block diagram showing the image analysis apparatus 4.

As shown in FIG. 2, the image analysis apparatus 4 according to the present embodiment includes a controller 41 (first hardware processor), a communication unit 42 and a storage 43.

The controller 41 is constituted of a central processing unit (CPU), a random access memory (RAM) and the like. The CPU of the controller 41 reads various programs stored in the storage 43 to expand them in the RAM, performs various kinds of processing in accordance with the programs thus expanded, and integrally controls operations of individual units of the image analysis apparatus 4.

The communication unit 42 is constituted of a wireless module and the like, and can transmit and receive various signals and various data to/from the other apparatuses 1 to 3, 5 and 6 and the like connected via the communication network 7 such as a local area network (LAN), a wide area network (WAN) and the Internet.

The storage 43 is constituted of a nonvolatile semiconductor memory, a hard disk drive and/or the like, and stores therein various programs executed by the controller 41, parameters needed for the controller 41 executing the programs, and the like.

The controller 41 of the image analysis apparatus 4 configured as above has functions as described below.

For example, the controller 41 has a function of acquiring data of dynamic images of a subject (first and second dynamic images) from an apparatus such as the modality, the console 3 and the image analysis apparatus 4 via the communication unit 42.

The "first dynamic image" denotes a dynamic image which is a target of diagnosis.

Moreover, the "second dynamic image" denotes a dynamic image which is a target of comparison, having been obtained by radiographing the same subject as that for the first dynamic image previously (previously to the first dynamic image).

Notably, when the subject has been radiographed a plurality of times previously to afford dynamic images, the controller 41 can also acquire a third dynamic image having been radiographed on a previous occasion different from that for the second dynamic image as a dynamic image which is another target of comparison different from that for the second dynamic image.

The "third dynamic image" can be another dynamic image radiographed on the same day as that for the first dynamic image, or a future radiographed image relative to the first dynamic image depending on a diagnosis case. That is, the third dynamic image is supposed to apply to all the dynamic images different from the dynamic images defined as the first dynamic image and the second dynamic image.

Moreover, the controller 41 may acquire a dynamic image of a different subject from that for the first dynamic image as a dynamic image which is a target of comparison.

Moreover, the controller 41 has a function of analyzing the acquired dynamic image and generating the analysis result data based on the analysis result.

The controller 41 according to the present embodiment can generate a plurality of analysis result data of different types.

In the present embodiment, the "analysis result data" includes an analyzed dynamic image generated by applying the analysis result as image processing parameters to the dynamic image, a specific frame image specified out of a plurality of frame images constituting the dynamic image or the analyzed dynamic image on the basis of the analysis result, predetermined analysis and measurement value measured based on the analysis result at a predetermined site of the subject, and an analysis graph obtained based on the analysis result.

Notably, while a case where the analysis result data includes all of those is herein described, the analysis result data only has to include at least any of those.

Moreover, in the present embodiment, each "analysis and measurement value" is any of the position of a specific point in a specific structure of the subject, the distance between the specific point and another point, the area of the specific structure, the volume of the specific structure, the signal value of a predetermined pixel in the subject, the maximum signal value within a predetermined range in the frame image, the minimum signal value within the predetermined range, the average value of all the signal values within the predetermined range, a cardiothoracic ratio, and the arrangement angle of the specific structure in the frame image such as the bending angle of a joint, and the rotation angle of a bone or an organ (inclination relative to a reference).

Notably, while a case where the analysis and measurement values include all of those is herein described, the analysis and measurement values only have to include at least any of those.

Moreover, in the present embodiment, the "specific frame image" is any of a frame image in which the analysis and measurement value is at its maximum, a frame image in which the analysis and measurement value is at its minimum, a frame image in which the analysis and measurement value coincides with the average value, a frame image in which the analysis and measurement value is within a predetermined range or the frame image in which it coincides with a predetermined value, and a frame image selected by the operator, out of the plurality of frame images.

Notably, when a still image is included in the same inspection, the "specific frame image" may be any of a frame image in which the analysis and measurement value is closest to the analysis and measurement value of the still image, and a frame image in which the analysis and measurement value is farthest from the analysis and measurement value of the still image, out of the plurality of frame images.

Moreover, when the dynamic image which is the target of analysis is obtained by radiographing a structure which periodically repeats a predetermined motion such as a lung, which repeats expansion and contraction, the "specific frame image" may be any of a frame image in which the analysis and measurement value is at its maximum, a frame image in which the analysis and measurement value is at its minimum, a frame image in which the analysis and measurement value coincides with the average value, a frame image in which the analysis and measurement value is within a predetermined range or the frame image in which it coincides with a predetermined value, and a frame image selected by the operator, for every cycle. In this case, a plurality of specific frame images are to be obtained with respect to one dynamic image.

Moreover, the "analysis graph" is a graph generated based on the analysis and measurement values.

Specifically, it is a graph in which the horizontal axis represents frame numbers and the vertical axis represents analysis and measurement values.

Moreover, the controller 41 according to the present embodiment can perform a plurality of kinds of analyses on the dynamic image.

Specifically, the controller 41 according to the present embodiment performs at least any of specific component difference processing, frequency emphasis processing, specific component tracking processing, specific signal change amount extraction processing, specific similar waveform pattern extraction processing and integrated image difference processing.

Among the above, the "specific component difference processing" is processing of enhancing, by reducing the signal value of a specific region in the target site of radiographing (for example, a rib and/or a collarbone in the pulmonary area), visibility of the region other than the specific region.

Moreover, the "frequency emphasis processing" is processing of making a specific region in the target site of radiographing clear by emphasizing the frequency of the edge of the specific region.

Moreover, the "specific component tracking processing" is processing of calculating the amount of movement and the speed of a specific region (for example, a diaphragm) in the target site of radiographing and calculating the distance between two different specific regions (for example, that between the pulmonal apex and the diaphragm).

Moreover, the "specific signal change amount extraction processing" is processing of visualizing change amounts of signal values with different colors.

Moreover, the "specific similar waveform pattern extraction processing" is processing of visualizing similarities to a specific signal change with different colors.

Moreover, the "integrated image difference processing" is processing of visualizing the total amount of signal change in radiographing by displaying the difference between the integrated image with the maximum signal value and the integrated image with the minimum signal value.

Notably, the controller 41 can also perform a combination of any of these analyses.

Moreover, the controller 41 can generate the analyzed dynamic image, the specific frame image, the analysis and measurement value and the analysis graph above for each analysis.

Moreover, the controller 41 according to the present embodiment automatically sets a first predetermined region on the basis of presetting made by a user before starting to generate the first dynamic image, or at least one of the position and the shape of a subject region in the frame images.

Figure 3A:
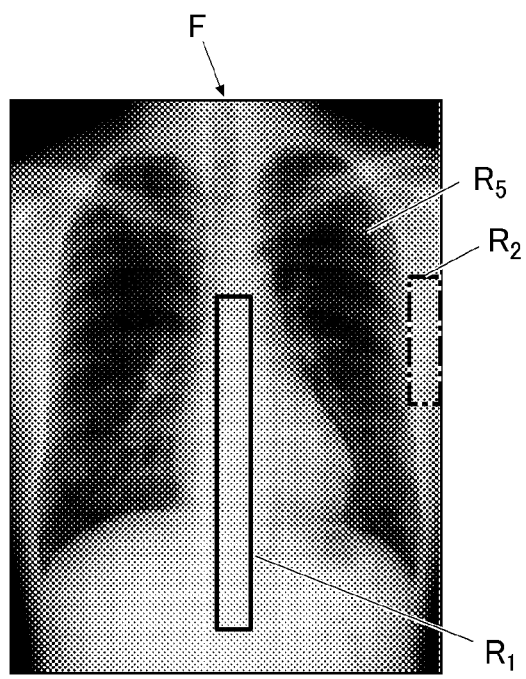
FIG. 3A is a diagram exemplarily showing a method of designating a specific region.
Figure 3B:
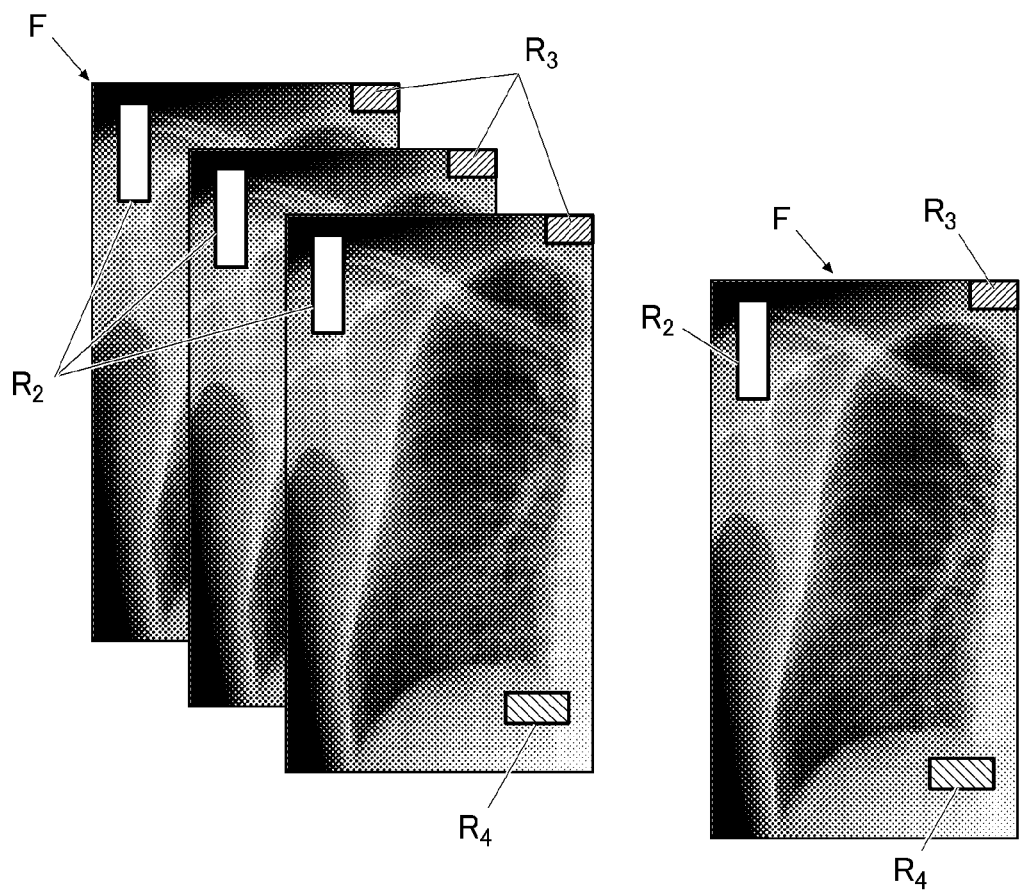
FIG. 3B is a diagram exemplarily showing another method of designating a specific region.

The "first predetermined region" denotes a site at which a visual change relatively scarcely arises due to progress of or recovery from a disease in the subject (at which a difference in signal value between radiographs is relatively small under the same radiographing conditions). Specifically, as shown in FIGS. 3A and 3B by way of example, the controller 41 according to the present embodiment sets at least any of thoracic vertebrae R1, a shoulder R2, cervical vertebrae R3, the subphrenic R4, and a lung R5 opposite to a lung which is a target of diagnosis out of the pair of lungs.

Notably, while the controller 41 may set one first predetermined region, it preferably sets a plurality of first predetermined regions in view of improvement of accuracy in image processing mentioned later.

Moreover, the controller 41 in the present embodiment can change the position of the first predetermined region in each of the frame images such that the position thereof follows a change in at least one of the position and the shape of the subject region in the dynamic image, the change arising in playing back the dynamic image.

Notably, the controller 41 may designate the first predetermined region on the basis of manual operation by the user.

Moreover, the controller 41 has a function of detecting a first signal value (signal value) in the first predetermined region in a frame image F of the first dynamic image acquired (generated by the modality).

When a plurality of first predetermined regions are set, the controller 41 is to detect first signal values from the respective first predetermined regions.

Moreover, the controller 41 detects first signal values from the respective frame images. That is, there are generally detected the number of first predetermined regions×the number of frames, of first signal values.

Moreover, the controller 41 has a function of detecting a second signal value of a pixel in the second predetermined region in which an identical site to that of the first predetermined region is imaged, the second predetermined region being in the frame image of the second dynamic image acquired (generated by the modality).

When a plurality of first predetermined regions are set, a plurality of second predetermined regions being therefore set, the controller 41 is to detect second signal values from the respective second predetermined regions.

Moreover, since the second predetermined region is the region in which the same thing is imaged as that imaged at the site in the first predetermined region, when the positions and/or the shapes of the subject regions in the first dynamic image and the second dynamic image are the same, the coordinates of the first predetermined region and the coordinates of the second predetermined region are the same, and when the positions and/or the shapes of the subject regions in the first dynamic image and the second dynamic image are different, the coordinates of the first predetermined region and the coordinates of the second predetermined region are different.

Notably, when the third dynamic image is acquired as well as the second dynamic image, the controller 41 may detect a third signal value of a pixel in the third predetermined region in which an identical site to that of the first predetermined region is imaged, the third predetermined region being in the frame image of the third dynamic image.

Moreover, the controller 41 has a function of determining an image processing condition for making the signal value in the first predetermined region in the first dynamic image close to the signal value in the second predetermined region in the second dynamic image on the basis of the plurality of first signal values and the plurality of second signal values detected.

The controller 41 preferably causes the signal value in the first predetermined region in the first dynamic image to coincide with the signal value in the second predetermined region in the second dynamic image.

Notably, the controller 41 may have a function of determining another image processing condition for making the signal value in the second predetermined region in the second dynamic image close to the signal value in the first predetermined region in the first dynamic image.

Since the dynamic image is composed of a plurality of frame images F, such an image processing condition is, for example, for setting the signal values in one predetermined region (for example, thoracic vertebrae) to be constant and setting contrast over the whole frame image to be constant, or for setting the signal values in a plurality of respective predetermined regions to be constant and allowing contrast over the whole frame image to be variable for each frame image, for each frame image F of the first dynamic image.

Moreover, examples of the image processing condition in the present embodiment include at least any of processing types of "gradation processing", "frequency emphasis processing", "noise reduction processing", "dynamic range compression processing" and "scattered radiation reduction processing".

Notably, the controller 41 in the present embodiment determines whether or not the designated predetermined region is appropriate as a region for detecting the signal value, and when determining not being appropriate, does not use the signal value that is detected from the predetermined region that is determined not being appropriate for determining the image processing condition.

The case where the predetermined region is "not appropriate" exemplarily denotes a case where the predetermined region is a site at which a large visual change arises along with progress of or recovery from a disease, and the similar case.

It also exemplarily denotes a case where the predetermined region includes a foreign object, such as a case where the subject includes a tube or a cardiac pacemaker.

Notably, when determining that the predetermined region is "not appropriate", the controller 41 may not only not use the signal value from the predetermined region not appropriate for determining the image processing condition but also may detect a predetermined region again from the range except the region not appropriate or change the detection method of the predetermined region to another one.

Moreover, when, in the case where a plurality of first predetermined regions are set, not all the signal values can be acquired from the plurality of first predetermined regions and the plurality of second predetermined regions designated (there are one or more first predetermined regions or second predetermined regions from which signal values cannot be acquired), the controller 41 in the present embodiment determines the image processing condition on the basis of one or more signal values that have been able to be acquired.

Examples of the "case where signal values cannot be acquired" include a case where the subject largely moves during radiographing and to follow the same causes the first predetermined regions or the second predetermined regions from which signal values are acquired to go beyond the frame image.

Moreover, when the third signal value is detected, the controller 41 in the present embodiment determines a second image processing condition for making the signal value in the first predetermined region in the first dynamic image close to the signal value in the third predetermined region in the third dynamic image on the basis of the third signal value and the first signal value detected.

Moreover, the controller 41 has a function of performing image processing on the first dynamic image under the determined image processing condition to generate the processed dynamic image.

Moreover, the controller 41 in the present embodiment extracts a frame image with the same phase as that for the specific frame image of the second dynamic image out of the plurality of frame images constituting the first dynamic image, and performs image processing on the extracted frame image to generate the processed dynamic image.

In this case, the controller 41 is to detect the second signal value from the specific frame image and to detect the first signal value from the extracted frame image.

Moreover, the controller 41 in the present embodiment performs image processing on the first dynamic image under the determined second image processing condition to generate a second processed dynamic image.

Moreover, the controller 41 has a function of generating a difference image between the generated processed dynamic image and the first dynamic image or the second dynamic image.

Notably, the controller 41 may have a function of generating a difference image between the generated second processed dynamic image and the first dynamic image or the third dynamic image.

Moreover, the controller 41 has a function of storing the generated processed dynamic image separately from the second dynamic image or with the second dynamic image replaced thereby.

The dynamic image is stored, for example, by transmitting data of the dynamic image to the PACS 5 to store the dynamic image in the database 51 thereof.

Notably, it may be stored in the storage 43 of the image analysis apparatus 4.

Moreover, the controller 41 may have a function of storing the determined image processing condition separately from the first dynamic image.

Moreover, the controller 41 has a function of calculating, based on the determined image processing condition, radial ray irradiation conditions such as the lamp voltage, the lamp current and the irradiation time (mAs value) under which conditions a signal value in a fourth predetermined region in which an identical site to that of the first predetermined region is to be imaged, the fourth predetermined region being in a fourth dynamic image to be radiographed later, comes close to the signal value in the second predetermined region in the second dynamic image.

Moreover, the controller 41 has a function of reporting the calculated radial ray irradiation conditions to the radial ray irradiation apparatus included in the modality.

Moreover, the controller 41 has a function of measuring cycles of predetermined repeated motions of the subject in the second dynamic image.

Moreover, the controller 41 according to the present embodiment has a function of instructing the subject on timing for the subject performing the predetermined repeated motions at the measured cycles during the modality generating the first dynamic image.

Specifically, the controller 41 according to the present embodiment repeatedly displays characters such as "breathe in" and "breathe out" on a display at the measured cycles, or repeatedly outputs voices such as "breathe in" and "breathe out" to a loudspeaker at the measured cycles.

Moreover, the controller 41 has a function of outputting data of the processed dynamic image to be stored, solely or along with the second dynamic image.

Transmission to an apparatus such as the PACS 5 and the client 6 via the communication unit 42 by the controller 41 according to the present embodiment is herein supposed to be the outputting by the controller 41.

Notably, when the image analysis apparatus 4 includes a display, display onto the display may be the outputting by the controller 41.

Moreover, when the controller 41 is configured to have the function of storing the image processing condition separately from the first dynamic image, the controller 41 may also be configured to have a function of outputting the image processing condition to be stored, solely or along with the first dynamic image.

A specific configuration of the image analysis apparatus 4 according to the present embodiment has been described as above. The console 3 and/or the PACS 5 may have at least one or some of the aforementioned functions the image analysis apparatus 4 has, instead.

Moreover, the dynamic image analysis system 100 does not need to be constituted of all the apparatuses and devices 1 to 6 mentioned above but can be constituted of one or some of the apparatuses and devices.

Client

Figure 4:
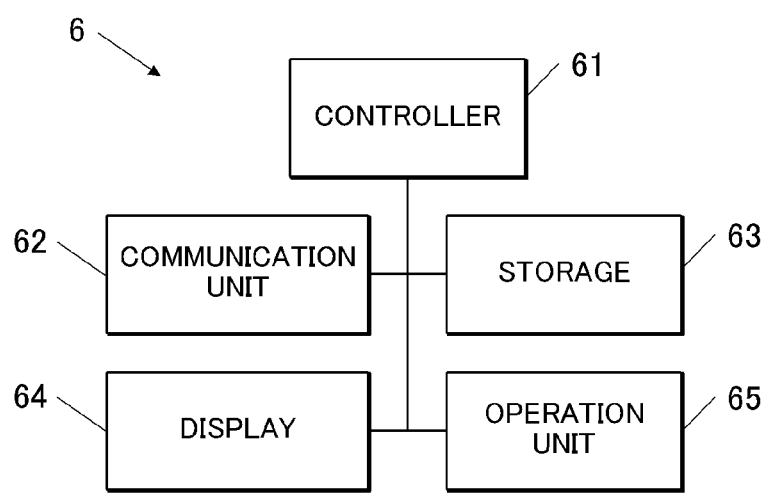
FIG. 4 is a block diagram exemplarily showing a client included in the dynamic image analysis system of FIG. 1.

Next, a specific configuration of the client 6 included in the aforementioned dynamic image analysis system is described. FIG. 4 is a block diagram showing a configuration of the client 6.

As shown in FIG. 4, the client 6 according to the present embodiment includes a controller 61 (second hardware processor), a communication unit 62, a storage 63, a display 64 and an operation unit 65.

The controller 61 and the communication unit 62 are configured to be similar to the controller 41 and the communication unit 42 in the image analysis apparatus 4, respectively.

The storage 63 is constituted of a nonvolatile semiconductor memory, a hard disk drive and/or the like, and stores therein various programs executed by the controller 61, parameters needed for the controller 61 executing the programs, and the like.

The display 64 is constituted of a monitor such as a liquid crystal display (LCD) and a cathode ray tube (CRT), and displays various images, various kinds of information and the like in accordance with instructions of display signals input from the controller 61.

The operation unit 65 is configured to be able to be operated by the operator through a keyboard including cursor keys, numeric keys, various function keys and the like, a pointing device such as a mouse, a touch panel stacked on the surface of the display 64, and/or the like.

Moreover, the operation unit 65 outputs various signals based on operations made by the operator to the controller 41.

Notably, the operation unit 65 not provided in the client 6, such an operation unit may be provided in the console 3, the image analysis apparatus 4, the PACS 5 or the like.

The controller 61 of the client 6 configured as above has functions as described below.

For example, the controller 61 has a function of receiving data of dynamic images such as the first, second and third dynamic images, the processed dynamic images, the difference images and the analyzed dynamic images via the communication unit 62.

Moreover, the controller 61 has a function of displaying an examination screen S on the display 64.

Figure 6:
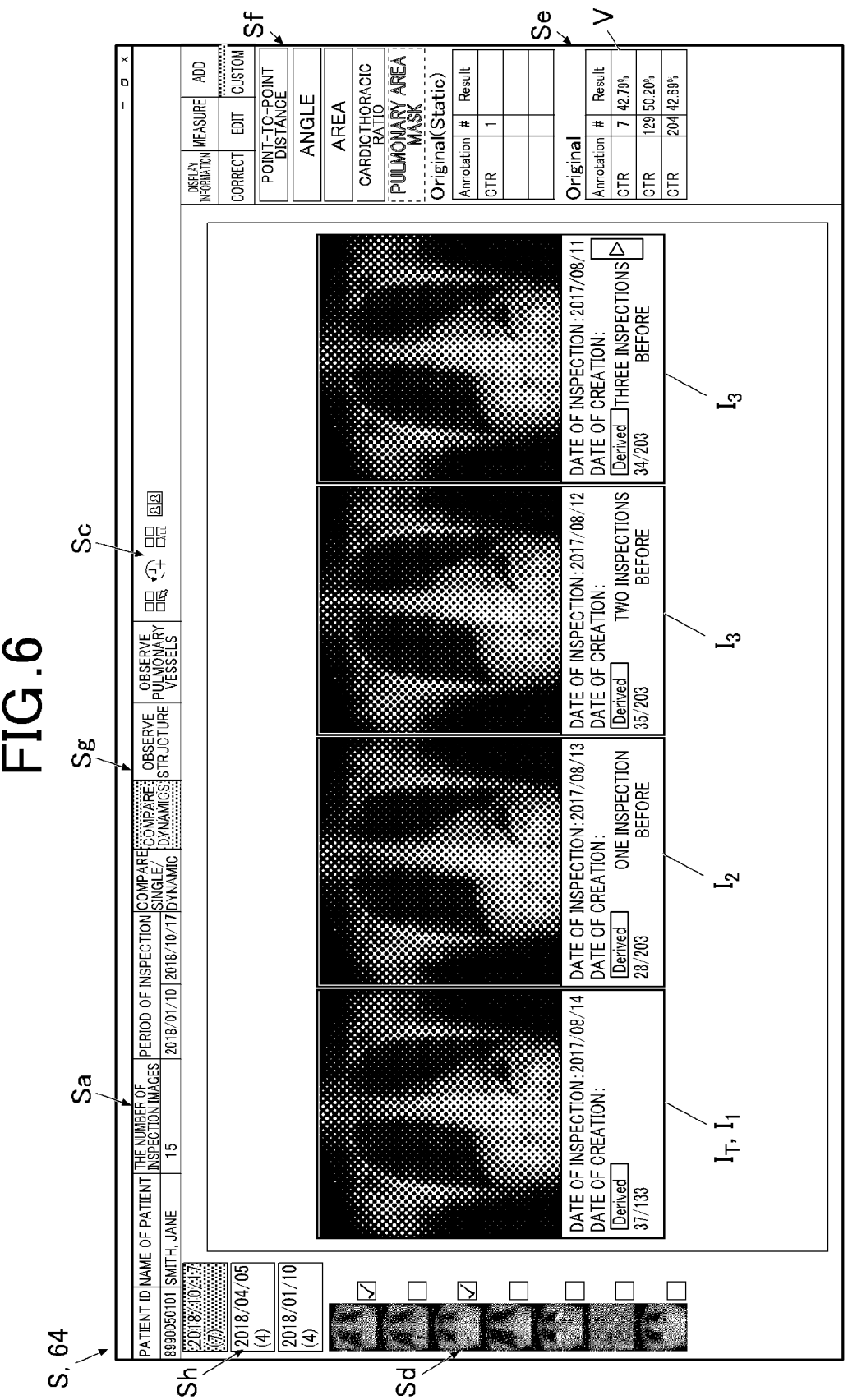
FIG. 6 is an example of the screen displayed by the client in FIG. 4.

As shown in FIG. 6 by way of example, the examination screen S in the present embodiment has an inspection information display Sa, an image display Sb, an image display switcher Sc, a thumbnail display Sd, a numerical value display Se, a numerical value display switcher Sf and an inspection switcher Sh.

Among these, the inspection information display Sa is a region for displaying the inspection information of a person inspected.

Moreover, the image display Sb is a region for displaying the dynamic image and/or the analyzed dynamic image of the person inspected, and an analysis graph G which is one of the analysis result data.

Moreover, the image display switcher Sc is a region in which various buttons for switching the display mode of the image display Sb are provided.

Moreover, the thumbnail display Sd is a region for displaying a list of thumbnails of the dynamic images and the various analyzed dynamic images belonging to the same inspection.

Moreover, the numerical value display Se is a region for displaying the analysis and measurement values which are of a type of the analysis result data.

Moreover, the numerical value display switcher Sf is a region in which buttons for selecting an analysis and measurement value to be displayed from among the plurality of kinds of analysis and measurement values are provided.

Moreover, the inspection switcher Sh is a region in which various buttons for switching inspections to be examined are provided.

Moreover, the controller 61 has a function of displaying dynamic images (at least any of the first, second and third dynamic images, the first and second processed dynamic images, the difference images, the analyzed dynamic images and the like) on the display 64.

The controller 61 according to the present embodiment displays them in the image display Sb on the display 64.

Figure 5:
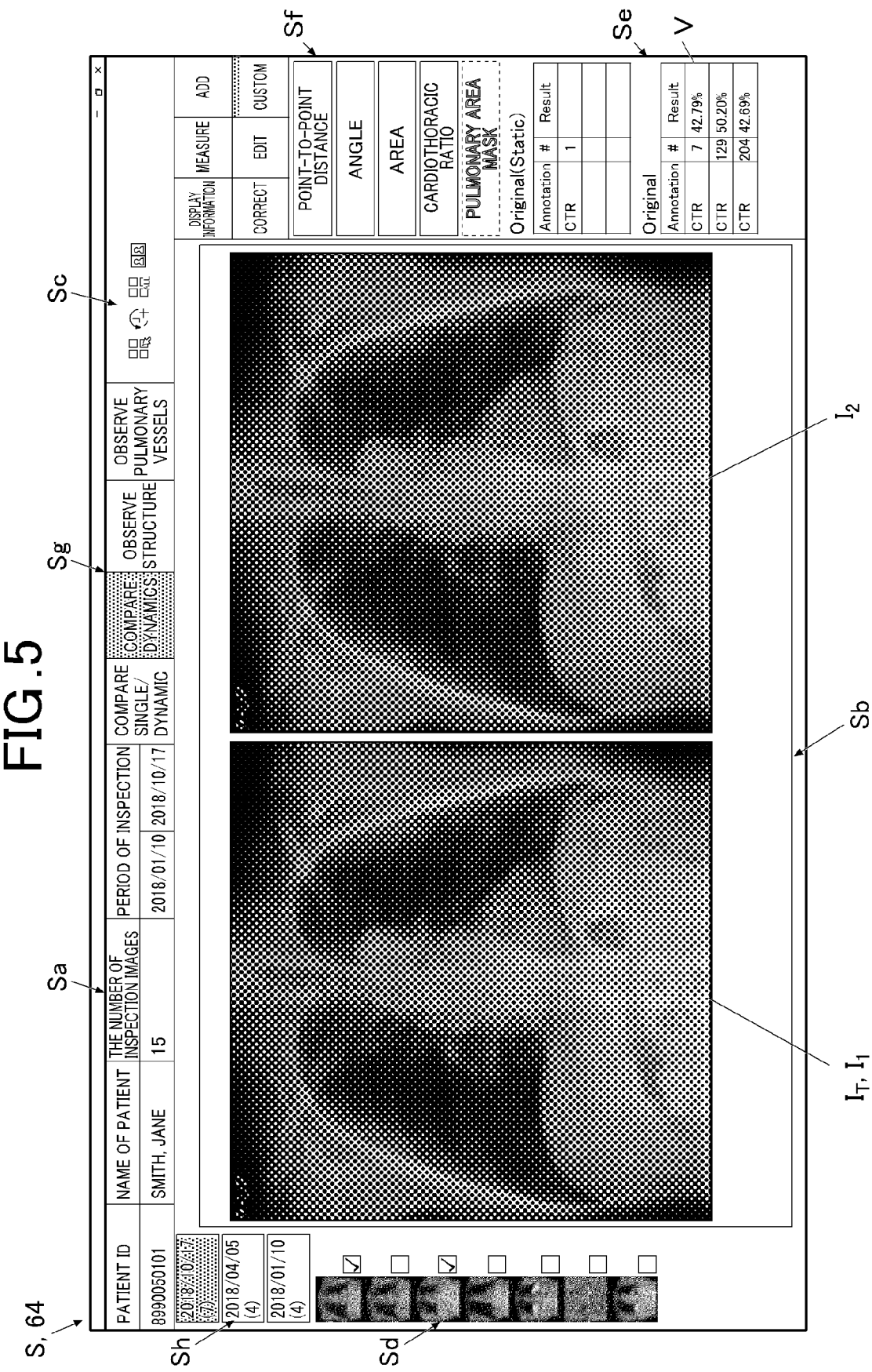
FIG. 5 is an example of a screen displayed by the client in FIG. 4.

Notably, the controller 61 in the present embodiment can display a generated processed dynamic image IT on the display 64 solely or with the same put beside a second dynamic image I2 as shown in FIG. 5.

Moreover, the controller 61 in the present embodiment can also display the generated processed dynamic image IT on the display 64 with the same put beside a first dynamic image I1 or with the same switched from the first dynamic image I1 having been displayed so far.

Moreover, when the second processed dynamic image is acquired, the controller 61 in the present embodiment can also display the generated second processed dynamic image on the display 64 with the same put beside the processed dynamic image or with the same switched from the processed dynamic image having been displayed so far.

Moreover, when the difference image is generated, the controller 61 in the present embodiment can display the generated difference image on the display 64 solely or with the same put beside at least any of the processed dynamic image, the first dynamic image and the second dynamic image.

Moreover, when the third dynamic image is acquired as well as the second dynamic image, the controller 61 can also display the processed image, the second dynamic image and the third dynamic images on the display 64 with these lined up as shown in FIG. 6, by way of example.

Notably, while FIG. 6 exemplarily shows the case of displaying two kinds of third dynamic images as well as the processed image and the second dynamic image (displaying four images in a form of a list), the controller 61 may display one kind of third dynamic image or three or more kinds of third dynamic images (display three images or five or more images in a form of a list).

The controller 61 controls such display of various dynamic images, and thereby, the dynamic images can be compared with one another.

Moreover, the controller 41 has a function of making phases of subjects predetermined repeated motions in the dynamic images coincide with one another when the cycles of the repeated motions of the subject are different between the processed dynamic image (or the first dynamic image) and the second dynamic image.

Figure 7:
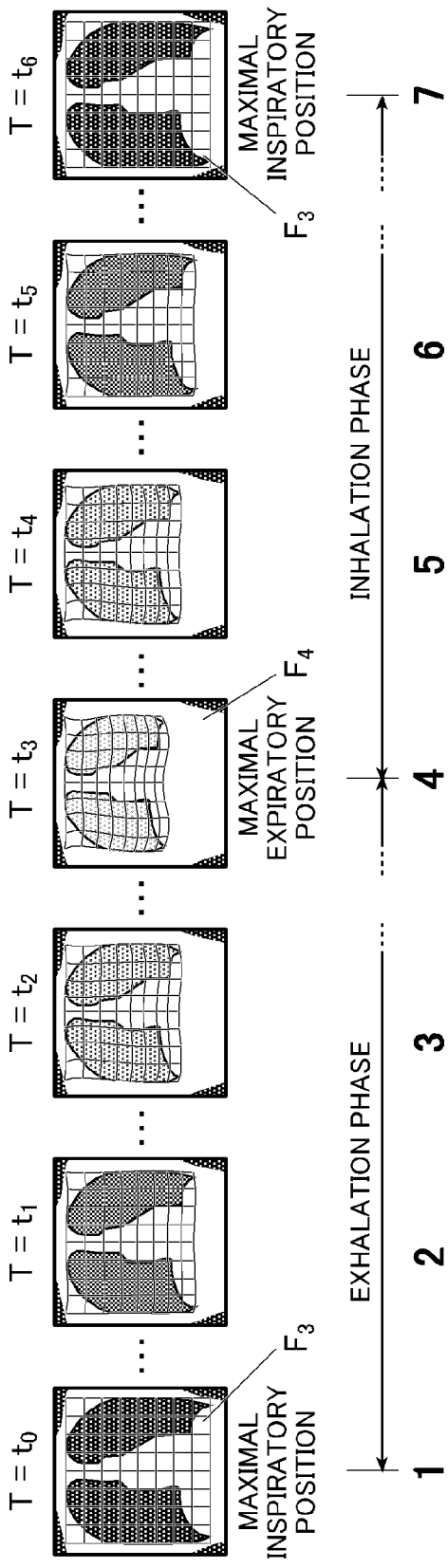
FIG. 7 is a diagram exemplarily showing a way of matching the phases of a first dynamic image and a second dynamic image.
Figure 7:
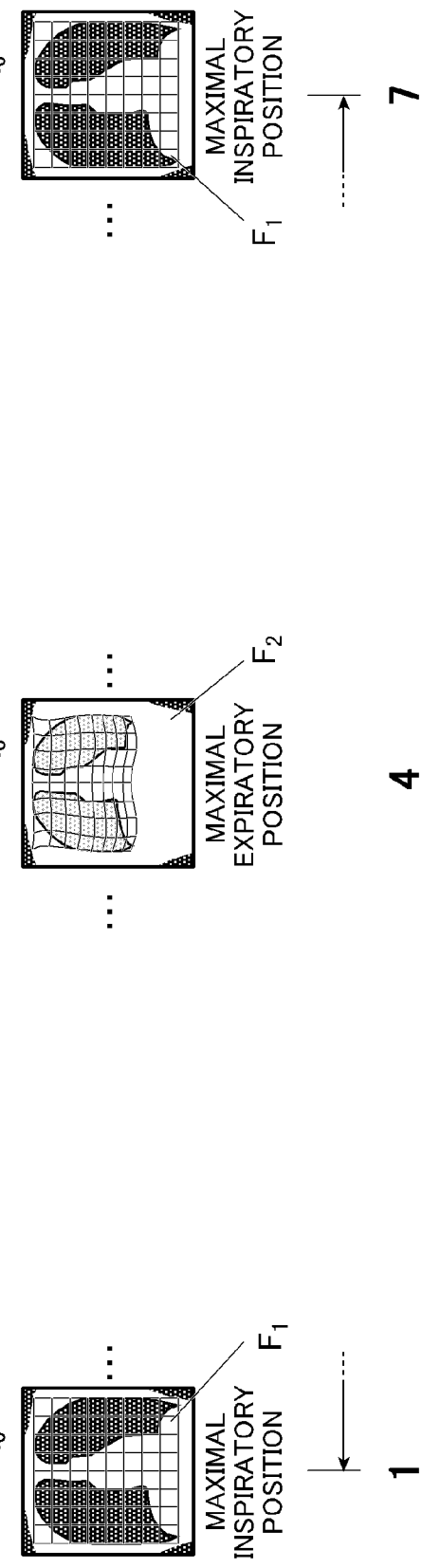

For example, when subjects breathing motion in one dynamic image of the processed dynamic image and the second dynamic image is relatively fast and the breathing motion in the other dynamic image is relatively slow, as shown in FIG. 7 by way of example, the controller 41 extracts a frame image F1 having the maximal inspiratory position of being most inhaled imaged and a frame image F2 having the maximal expiratory position of being most exhaled imaged from the faster dynamic image (herein the processed dynamic image), and when playing back the slower dynamic image (herein the second dynamic image), makes control of displaying the frame image F1 (F2) having the maximal inspiratory position (maximal expiratory position) imaged in the faster dynamic image at the time when displaying a frame image F3 (F4) having the maximal inspiratory position (maximal expiratory position) imaged in the slower dynamic image.

Otherwise, the controller 61 causes the cycles of the repeated motion in one dynamic image of the first dynamic image and the second dynamic image to coincide with the cycles of the repeated motion in the other dynamic image. For example, as shown in FIG. 8A, when subjects breathing motion in the one dynamic image is relatively fast and the breathing motion in the other dynamic image is relatively slow, the controller 61 slows the playback speed of the one dynamic image as shown in FIG. 8B by way of example, or increases the playback speed of the other dynamic image as shown in FIG. 8C, by way of example.

Notably, the controller 61 may allow the phases of the first dynamic image and the second dynamic image to be displaced from each other within a certain range, for example, in several frames (such that a diagnostician cannot recognize such a displacement between both dynamic images with the naked eye), not causing them to completely coincide with each other.

Moreover, when playing back the processed dynamic image the phase of which is caused to coincide with its counterpart, the controller 61 may change the playback speed of the processed dynamic image or of the processed dynamic image and the second dynamic image (perform the playback slower or faster than at a usual speed).

Moreover, the controller 61 may stop the processed dynamic image or the processed dynamic image and the second dynamic image being played back, at the time when the display 64 displays a characteristic frame image or at the time when the speed of subjects predetermined motion comes at or exceeds a predetermined one.

Moreover, the controller 61 may play back the processed dynamic image with the same superimposed on the second dynamic image.

Notably, these can be applied to a case where the second processed dynamic image or the second processed dynamic image and the third dynamic image are played back.

Moreover, the controller 61 according to the present embodiment has a function of displaying analysis and measurement values V measured by the image analysis apparatus 4 on the display 64.

For example, as shown in FIG. 5, in the present embodiment, they are displayed in the numerical value display Se on the display 64.

A specific configuration of the client 6 according to the present embodiment has been described as above. The console 3 and/or another apparatus including a display may have at least one or some of the aforementioned functions the client 6 has, instead.

On conventional medical follow-up, there have occasionally occurred a case where differences in radiographing conditions between a dynamic image of a target of diagnosis and a past dynamic image of the target of comparison result in a change in signal value (concentration) at a site at which a visual change relatively scarcely arises due to progress of or recovery from a disease, and a case where performing image processing with a site (for example, a lung) at which a signal value largely changes in a short time being as a reference results in a variation in signal value even among frame images. According to the dynamic image analysis system 100 according to the present embodiment having been described as above, however, since the signal value in the first predetermined region can be made close to (coincide with) the signal value in the second predetermined region and the signal value in the first predetermined region in each frame image of the first dynamic image can match the signal value in the second predetermined region in the corresponding frame image of the processed dynamic image from every frame image, a diagnostician can compare the dynamic images with one another as if they were to be radiographed under the same radiographing conditions and to undergo the same image processing for every frame image.

As a result, the diagnostician can correctly manage medical follow-up using radiographs of the target of diagnosis and past radiographs which are targets of comparison even when such radiographs are dynamic images.

Moreover, radiographing a dynamic image is performed during a certain duration (for example, tens of seconds), being different from radiographing a still image, which is instantly done. Therefore, there can be a case where the cycles and/or the phases of dynamic images obtained even under the same radiographing conditions differ depending on patients physical condition and a radiographing environment.

According to the dynamic image analysis system 100 according to the present embodiment, however, data of the second dynamic image can also be adjusted such that the cycle and the phase of subjects predetermined repeated motion in the second dynamic image coincide with the cycle and the phase of the repeated motion of the subject in the first dynamic image. Thereby, the dynamic image analysis system 100 can apply image processing to dynamic images with the same cycles and the same phases regardless of patients physical condition or a radiographing environment to display them for comparison therebetween.

Moreover, the dynamic image analysis system 100 according to the present embodiment can match, using the cycle and the phase of radiographing measured from the second dynamic image, the cycle and the phase of subjects repeated motion using the function of instruction on timing with characters and/or voices such that the occasion of radiographing the subject for the modality generating the first dynamic image matches the cycle and the phase of radiographing of the second dynamic image.

Thereby, the dynamic image analysis system 100 can display the dynamic images the cycles and the phases of which match each other for comparison therebetween, and a diagnostician can make diagnosis correctly.

The present invention has been specifically described based on some embodiments as above. The present invention is not limited to the aforementioned embodiments but it is needless to say that they can be properly modified without departing from the spirit of the same.

Although embodiments of the present invention have been described and illustrated in detail, the disclosed embodiments are made for purposes of illustration and example only and not limitation. The scope of the present invention should be interpreted by terms of the appended claims.

What is claimed is:

1. A dynamic image analysis system comprising:
a modality that generates dynamic images including a first dynamic image and a second dynamic image each composed of a plurality of frame images indicating dynamics of a subject, wherein the dynamic images are medical images, and the first dynamic image and the second dynamic image are derived from two different dynamic images separately obtained during two different sessions; and
a first hardware processor that:
detects a first signal value of a pixel in a first predetermined region in each of the frame images of the first dynamic image generated by the modality;
detects a second signal value of a pixel in a second predetermined region in which an identical site to that of the first predetermined region is imaged, the second predetermined region being in each of the frame images of the second dynamic image generated by the modality;
determines an image processing condition for making the first signal value in the first predetermined region in the first dynamic image close to the second signal value in the second predetermined region in the second dynamic image, based on the first signal value and the second signal value detected; and
performs image processing on the first dynamic image under the determined image processing condition to generate a processed dynamic image,
wherein the first hardware processor:
calculates, based on the determined image processing condition, a radial ray irradiation condition under which a signal value of a pixel in a fourth predetermined region in which an identical site to that of the first predetermined region is to be imaged, the fourth predetermined region being in a fourth dynamic image to be radiographed, comes close to the signal value in the second predetermined region in the second dynamic image; and reports the calculated radial ray irradiation condition to a radial ray irradiation apparatus included in the modality.

2. The dynamic image analysis system according to claim 1, wherein the first hardware processor designates the first predetermined region automatically or based on manual operation by a user.

3. The dynamic image analysis system according to claim 2, wherein the first hardware processor performs the automatic designation of the first predetermined region based on presetting made by the user before the modality starts generating the first dynamic image, or at least one of a position and a shape of a subject region in the frame images.

4. The dynamic image analysis system according to claim 2, wherein the first hardware processor is capable of changing a position of the first predetermined region in each of the frame images of the first dynamic image such that the position follows a change in at least one of the position and the shape of the subject region in the first dynamic image, the change arising in playing back the first dynamic image.

5. The dynamic image analysis system according to claim 2, wherein the first hardware processor:
    determines whether or not the designated first predetermined region is appropriate as a region for detecting the signal value; and
    does not use, when determining not being appropriate, the signal value that is detected from the first predetermined region that is determined not being appropriate for determining the image processing condition.

6. The dynamic image analysis system according to claim 1, wherein in at least one of a case of being incapable of acquiring a signal value from one or some first predetermined regions of a plurality of the first predetermined regions and a case of being incapable of acquiring a signal value from one or some second predetermined regions of a plurality of the second predetermined regions, the first hardware processor determines the image processing condition based on one or more signal values capable of being acquired.

7. The dynamic image analysis system according to claim 1, wherein the image processing condition includes at least one of gradation processing, frequency emphasis processing, noise reduction processing, dynamic range compression processing and scattered radiation reduction processing.

8. The dynamic image analysis system according to claim 1, comprising a second hardware processor that displays the processed dynamic image generated by the first hardware processor solely or with the processed dynamic image placed beside the second dynamic image on a display.

9. The dynamic image analysis system according to claim 1, wherein the first hardware processor:
    stores the generated processed dynamic image separately from the first dynamic image or with the first dynamic image replaced by the processed dynamic image, in a storage or a database of another apparatus; and
    outputs the processed dynamic image stored in the storage or the database solely or along with the first dynamic image.

10. The dynamic image analysis system according to claim 1, wherein the first hardware processor:
    stores the determined image processing condition separately from the first dynamic image, in a storage or a database of another apparatus; and
    outputs the image processing condition stored in the storage or the database solely or along with the first dynamic image.

11. The dynamic image analysis system according to claim 1, wherein the first hardware processor:
    measures a cycle of a predetermined repeated motion of the subject in the second dynamic image; and
    instructs the subject on timing for the subject performing the predetermined repeated motion at the measured cycle during the modality generating the first dynamic image.

12. The dynamic image analysis system according to claim 1, wherein
    the first hardware processor analyzes the dynamic image, and based on an analysis result, measures a predetermined analysis and measurement value at a predetermined site of the subject, the system comprising
    a second hardware processor that displays the analysis and measurement value measured by the first hardware processor on a display.

13. The dynamic image analysis system according to claim 1, wherein the medical images are radiographed images.

* * * * *